US006621805B1

United States Patent
Kondylis et al.

(10) Patent No.: US 6,621,805 B1
(45) Date of Patent: Sep. 16, 2003

(54) METHOD AND APPARATUS FOR MULTICASTING REAL-TIME VARIABLE BIT-RATE TRAFFIC IN WIRELESS AD-HOC NETWORKS

(75) Inventors: George D. Kondylis, Santa Monica, CA (US); Srikanth V. Krishnamurthy, Calabasas, CA (US); Son Dao, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 565 days.

(21) Appl. No.: 09/631,485

(22) Filed: Aug. 3, 2000

Related U.S. Application Data (60) Provisional application No. 60/161,327, filed on Oct. 25, 1999.

(51) Int. Cl.⁷ ............................................... H04J 15/00
(52) U.S. Cl. ...................... 370/329; 370/338; 370/348; 370/397; 455/445
(58) Field of Search ............................... 370/329, 331, 370/335, 342, 344, 349, 347, 445, 320, 321, 336, 337, 395.21, 395.2, 395.4, 395.43, 389; 455/445–455, 446, 500, 502, 503, 507, 524, 525

(56) References Cited

U.S. PATENT DOCUMENTS

| | | | |
|---|---|---|---|
| 5,506,847 A | * | 4/1996 | Shobatake |
| 5,623,495 A | * | 4/1997 | Eng et al. |
| 5,787,080 A | * | 7/1998 | Hulyalkar et al. |
| 6,026,303 A | * | 2/2000 | Minamisawa |

FOREIGN PATENT DOCUMENTS

| | | |
|---|---|---|
| GB | 2330734 | 4/1999 |
| WO | 0048367 | 8/2000 |

OTHER PUBLICATIONS

Ballardie et al. "An architecture for Scalable Inter–Domain Multicast Routing", 1993, pp 85–95.*
Kondylis et al. "Multicasting sustained CBR and VBR traffic in wireless ad–hoc networks" IEEE conference, ICC 2000.*
JJ Garcia et al., "A Multicasting Protocol for Ad–hoc Networks" INFOCOM, 1999.*

(List continued on next page.)

*Primary Examiner*—Alpus H. Hsu
*Assistant Examiner*—Afsar M. Qureshi
(74) *Attorney, Agent, or Firm*—Tope-McKay & Associates (57) ABSTRACT

A real-time multicast scheduler method and apparatus is presented, to facilitate multicasting of real-time variable bit rate data in wireless ad-hoc networks. Variable bit rate traffic cannot tolerate delay jitter. However, a small amount of packet losses may be tolerable. In order to ensure the provisioning of a desired level of quality of service, bandwidth is reserved on the multicast structure. A goal of the real-time multicast scheduler is to avoid packet collisions and to facilitate color re-use, where "color" is defined as a channel selected as a combination of time-division multiple access, frequency-division multiple access, and code-division multiple access schemes. The real-time multicast scheduler provides a self-healing network which corrects for disconnections caused by node movement and nodes moving out of range of each other, while accounting for colors already assigned for data transmission in order to prevent packet collisions.

20 Claims, 5 Drawing Sheets

OTHER PUBLICATIONS

A. Ephremides and T. V. Truong, "Scheduling Broadcasts in Multihop Radio Networks", IEEE Trans. Commun., vol. 38, pp. 456–460, Apr. 1990.

A. Ramanthanand E.L. Lloyd, "Scheduling Algorithms for Multihop Radio Networks", IEEE/ACM Trans. on Networking, vol. 1, pp. 166–177, 1993.

C. Zhu and M.S. Corson, "A Five–Phase Reservation Protocol (FPRP) for Mobile Ad–hoc Networks", in Proceedings Infocom 1998.

I. Chlamtac and A.Farago, "Making Transmission Schedules Immune to Topology Changes in Multi–hop Packet Radio Networks", IEEE/ACM Trans. On. Networking, vol. 2, pp. 23–29, Feb. 1994.

S. Chong andJ. Gosh, "Predictive Dynamic Bandwidth Allocation for Efficient Transport of Real–Time VBR Video Over ATM", IEEE J. Select. Areas Commun., vol. 13, pp. 12–23, Jan. 1995.

S. Q. Li, S. Chong, C. Hwang,and X. Zhao, "Link Capacity Allocation and Network Control by Filtered Imput Rate in High–Speed Networks", in Proc. IEEE Globecom '90, pp. 327–331, Dec. 1990.

G. J. Pottie, "System Design Choices in Personal Communications", IEEE Personal Commun., pp. 50–67, Oct. 1995.

J. Broch et al., "A Performance Comparison of Multi–Hop Wireless Ad Hoc Network Routing Protocols", Proceedings of MOBICOM '98.

J. J. Garcia–Luna–Aceves and E L. Madruga, "A Multicast Routing Protocol for Ad–hoc Networks", in Proceedings INFOCOM, 1999.

P. P. White, "RSVP and Integrated Services on the Internet: a tutorial", IEEE Commun. Magazine, vol. 35, pp. 100–106, May 1997. Trans. On. Networking, vol. 2, pp. 23–29, Feb. 1994.

C.E. Perkins, P. Bhagwat, "Highly Dynamic Destination–Sequenced Distance–Vector Routing (DSDV) for Mobile Computers", Proceedings of SIGCOMM'94.

C.R. Lin and J.S. Liu, "QoS Routing in Ad Hoc Wireless Networks", IEEE Journal on Selected areas in Communications, vol. 17, No. 8, Aug. 1999.

A. J. Ballardie, P. F. Francis and J. Crowcroft, "Core Based Trees", in Proceedings of ACM SIGCOMM, 1993.

http://pcl.cs.ucla.edu/projects/parsec/.

Kondylis, G. D., et al. "Multicasting sustained CBR and VBR traffic in wireless ad–hoc networks" ICC 2000 IEEE Int'l Conference on Comm. Conference Record. New Orleans, LA, Jun. 18–21, 2000, IEEE, New York, NY, US, vol. 1 of 3, Jun. 18, 2000, pp. 543–549, XP001043006.

Wieslthier, J.E., et al. "On the construction of energy–efficient broadcast and multicast trees in wireless networks" INFOCOM 2000, 19th Annual Joint Conf. of the IEEE Comp. and Comm. Soc's, Proc., Tel Aviv, Israel Mar. 26–30, 2000, Piscataway, NJ, USA, Mar. 26, 2000, pp. 585–594, XP010376147.

* cited by examiner

METHOD AND APPARATUS FOR MULTICASTING REAL-TIME VARIABLE BIT-RATE TRAFFIC IN WIRELESS AD-HOC NETWORKS

This application claims the benefit of Provisional Application Ser. No. 60/161,327 filed Oct. 25, 1999.

TECHNICAL FIELD

The present invention is related to network communications. More particularly, this specification discloses a method and an apparatus for the generation and maintenance of a wireless ad-hoc network for multicasting real-time variable-bit-rate (VBR) data among a plurality of nodes.

BACKGROUND

Wireless ad-hoc networks consist of collections of "peer" mobile nodes, capable of communicating with each other, and forming a dynamically changing network with no infrastructure. In order to route packets to a destination node, each node in a wireless ad-hoc network uses other nodes in the network as relays. Therefore, it is desirable that the nodes in the network establish routing among themselves, and that the routes keep changing as the nodes move, or as the environment changes due to such factors as fading and interference. Many routing protocols have been proposed to enable effective routing in such an environment, examples of which are provided in the articles cited below. In particular, multicasting has received much attention in the Internet community. Most of the development in multicast protocols, however, has addressed wireline, fixed networks having static topologies, and are focused toward Internet applications. The majority of these Internet multicast protocols do not consider the issue of resource reservation, because the available bandwidth is generally not a problem in wireline networks. Recently, the Core-Assisted Mesh Protocol (CAMP) was proposed for effective wireless multicasting of datagram traffic. However, CAMP neither supports real-time traffic nor does it attempt to guarantee any level of quality of service (QoS). No protocol developed to date addresses multicast streaming of real-time data in a wireless ad-hoc network environment.

Most multicast protocols result in the formation of a multicast structure, which is used for transportation of multicast data. Some schemes utilize core nodes or rendezvous points, which are used to collect multicast data from sources (if there are more than one) and then to multicast the data from these nodes to the receivers. The structure built typically takes the form of a tree or a mesh.

QoS is currently a focal point of attention in both wireline and wireless networks. There are two major ideologies for delivering QoS guarantees: the integrated services model and the differentiated services model. The integrated services model attempts to provide a guaranteed notion of service, which involves reserving bandwidth from the source node to the destination node. RSVP is a signaling protocol which supports reservation of resources for multicast sessions in the Internet and is part of the integrated services specification. On the other hand, the differentiated services model is based on assigning resources to a user or edge router on a quasi-static basis. The resource is thus reserved based on what is called a service level agreement (SLA) and is then used to carry multiple classes of data. Each class of data receives a particular quality of service in terms of per-hop forwarding at each router. While, the differentiated services model is much simpler to implement than the integrated services model, it does not provide strict end-to-end quality of service guarantees in terms of bandwidth or delay.

Presently, there is a need for a multicasting method and system that is capable of supporting real-time variable bit-rate (VBR) data among the nodes of a wireless network. It is also desirable that the system be distributed, highly adaptive to variations, flexible, and scalable. Several heuristic methods have appeared in the literature, and are cited below, with the goal of developing collision-free transmission schedules. Furthermore, other approaches, also cited below, have been developed which relax the strict collision-free requirement, and in which nodes are allowed to transmit the same packet several times, where the method guarantees that at least one transmission is collision-free. Although this approach makes scheduling transparent to the network topology changes, it has the disadvantage that a packet might encounter many collisions before being able to transmit collision-free, thus significantly impacting network throughput.

A related multicast scheduler has been presented in application titled "Method and Apparatus for Multicasting Real-Time Traffic in Wireless-Ad-Hoc Networks" for the provision of multicasting real-time constant bit-rate (CBR) traffic in a wireless ad-hoc network. However, real-time bursty VBR traffic presents a more difficult challenge for performing resource allocation because of its dynamically changing bandwidth requirements and its sensitivity to delay jitter. VBR traffic is both delay-sensitive and has a high degree of burstiness. For example, the peak bit-rate of video sources is several times that of their average bit rate. If bandwidth is allocated to satisfy the peak rate, the result is extremely inefficient bandwidth utilization. This kind of allocation can be sufficient for wired Internet applications, where bandwidth abounds, but the scarcity of wireless bandwidth makes this approach unacceptable for wireless ad-hoc networks. Thus, it is desirable to provide a means to reserve bandwidth adaptively in order to match the burst rate of the source dynamically. It is further desirable to re-use unused bandwidth for other applications.

References

1. A. Ephremides and T. V. Truong, "Scheduling Broadcasts in Multihop Radio Networks", IEEE Trans. *Commun.*, vol. 38, pp. 456–460, April 1990.
2. S. Ramanathan and E. L. Lloyd, "Scheduling Algorithms for Multihop Radio Networks", *IEEE/ACM Trans. On Networking*, vol. 1, pp. 166–177, 1993.
3. C. Zhu and M. S. Corson, "*A Five-Phase Reservation Protocol (FPRP) for Mobile Ad-hoc Networks*, in Proceedings Infocom 1998.
4. I. Chlamtac and A. Farago, "Making Transmission Schedules Immune to Topology Changes in Multi-hop Packet Radio Networks", *IEEE/ACM Trans. On Networking*, vol. 2, pp. 23–29, February 1994.
5. S. Chong and J. Gosh, "Predictive Dynamic Bandwidth Allocation for Efficient Transport of Real-time VBR Video over ATM", *IEEE J. Select. Areas Commun.*, vol. 13, pp. 12–23, January 1995.
6. S. Q. Li, S. Chong, C. Hwang, and X. Zhao, "Link Capacity Allocation and Network Control by Filtered Input Rate in High-Speed Networks", in *Proc. IEEE Globecom'90*, December 1990, pp. 327–331.
7. G. J. Pottie, "System Design Choices in Personal Communications", *IEEE Personal Commun.*, pp. 50–67, October 1995.
8. D. Bertsekas and R. Gallagher, "Data Networks", $2^{nd}$. ed., Prentice Hall 1992.

9. C. E. Perkins and P. Bhagwat, "Highly dynamic Destination-Sequenced Distance Vector routing (DSDV) for mobile computers", *Proceedings of SIGCOMM'94*;
10. J. Broch et al, "A Performance Comparison of Multi-Hop Wireless Ad Hoc Network Routing Protocols", *Proceedings of MOBICOM'98*;
11. D. Waitzmann, S. Deering and C. Partridge, "Distance vector multicast routing protocol", RFC1075 (1988);
12. A. J. Ballardie, P. F. Francis and J. Crowcroft, "Core Based Trees", in Proceedings of ACM SIGCOMM, 1993;
13. J. J. Garcia-Luna-Aceves and E. L. Madruga, "A multicast routing protocol for ad-hoc networks", in *Proceedings INFOCOM*, 1999
14. P. Ferguson and G. Hutson, *"Quality of service: Delivering QoS on the Internet and in Corporate Networks"*, John Wiley and Sons, Inc. 1998;
15. P. P. White, "RSVP and integrated services on the Internet: a tutorial", *IEEE Commun. Magazine*, vol. 35, pp. 100–6, May 1997; and
16. http://pcl.cs.ucla.edu/projects/parsec/.

SUMMARY

The present invention provides a method and an apparatus for transmission of variable bit-rate data through a wireless network. Specifically, the method of the present invention provides for bandwidth reservation for real-time traffic in a wireless ad-hoc network having a plurality of nodes transmitting and receiving data via a plurality of colors, with the transmitting and receiving of the data being performed periodically with a data period 2. Each of the plurality of nodes has a either a connected or disconnected connection state of either connected or disconnected. The plurality of nodes includes a communication origin node from which a data transmission occurs. Each node has a super-frame including a transmitting frame for transmitting packets and a receiving frame for receiving packets. The transmitting packets have a transmit sequence within the transmitting frame. The receiving packets have a receiving sequence within the receiving frame. A frame position F defines the position of transmitting frame within in the super-frame. Also defined are a set of transmit colors in which the node is currently transmitting, a set of colors in which the node is currently receiving, a set of usable colors, and a set of unusable colors. The nodes from which a particular node receives are identified as the parents of the particular node, with the particular node identified as the child of the parent nodes. The transmitting frame of a parent node is the receiving frame of its child node. The method comprises the following steps:

a. periodically transmitting a disconnected maintenance packet from each disconnected node, with each disconnected maintenance packet including the disconnected maintenance packet transmitting node ID, the node IDs of the parent nodes from which disconnected node seeks to receive, the frame position F of the disconnected maintenance packet transmitting node, the colors in which the disconnected maintenance packet transmitting disconnected node seeks to receive, and the receiving sequence for the disconnected maintenance packet transmitting node;

b. periodically transmitting a connected maintenance packet from each connected node, with each connected maintenance packet including the node ID of the connected maintenance packet transmitting node, the node IDs of the parent nodes from which connected node is currently receiving, the frame position of the node transmitting the connected maintenance packet, the colors in which the connected maintenance packet transmitting node receives, the receiving sequence for the maintenance packet transmitting node, a set of the usable colors in which the connected node may transmit, and a set of unusable colors in which the connected node is prohibited from transmitting;

c. receiving, at each particular node of the plurality of nodes, the maintenance packets from all nodes within a transmission range of the particular node;

d. using the maintenance packets received at each particular node to update the set of usable colors and the set of unusable colors for the particular node, where the set of usable colors for the particular node is defined as the complement of the set of unusable colors, and where the set of unusable colors of a first node N0 having transmit frame position F0 includes color c0 if there is at least one node Nj within transmit range of node N0, having a receive frame position of F0, such that node Nj is not a child of node N0, where node N0 receives in color c0 from a parent node Ni, where the parent node Ni is not also a parent of Nj, and $$SIR(N_j) = \frac{G_{ij}}{\sum_{k \neq i} G_{kj} + G_{0j}} < \gamma_1,$$

for a preset $\gamma_1$, such that $\gamma_1 > \gamma$, where:

k represents an index over all of the nodes having transmit frame positions of F0 and transmit color C0;

$G_{ij}$ represents the transmission power loss between the parent node Ni and node Nj;

$G_{kj}$ represents the transmission power loss between a given node having an index k and transmit frame position F0, and node Nj;

$G_{0j}$ represents the transmission power loss between node N0 and node Nj;

γ represents the threshold Signal-to-Interference Ratio (SIR) for a transmission, below which a transmission cannot take place; and $\gamma_1$ represents a preset SIR level greater than γ and chosen to decrease the probability of $SIR(Nj) < \gamma$; and e. reserving colors c0 and establishing data connections for connected and disconnected nodes Na, where a node Na can reserve color ca for receiving from a neighboring node Nc if node Na has receive frame Fc, and if node Nc can transmit in color c0 as determined in step d, and if the SIR of node Na satisfies the equation:

$$SIR(N_a) = \frac{G_{ca}}{\sum_{k \neq c} G_{ka}} < \gamma_2,$$

for some preset $\gamma_2$, such that $\gamma_2 > \gamma$, where:

k represents an index over all of the nodes having transmit frame positions of Fa and transmit color C0;

$G_{ja}$ represents the transmission power loss between node Nc and node Na;

$G_{ka}$ represents the transmission power loss between a given node having an index k and a frame position Fc, and node Na;

γ represents the threshold SIR for a transmission, below which a transmission cannot take place; and $\gamma_2$ represents a preset SIR level greater than γ and chosen to decrease the probability of $SIR(Nc) < \gamma$; and f. periodically repeating steps a through e to update the ad-hoc network.

Colors are defined as channels developed from combinations selected from the group consisting of TDMA, CDMA, and FDMA schemes.

The present invention includes both the provision of a wireless ad-hoc network and operating the method on a pre-existing wireless ad-hoc network. Furthermore, the present invention includes a wireless ad-hoc network developed and maintained by the method of the present invention.

Additionally, the set of unusable colors of a first node N0 having transmit frame position F0 may be defined, as differentiated from step e above, as including color c0 if there is at least one node Nj within transmit range of node N0, having a receive frame position of F0, such that node Nj is not a child of node N0, where node N0 receives in color.

These features will be explained in detail in the detailed description and the accompanying drawings.

BRIEF DESCRIPTION OF THE DRAWINGS

FIG. 3($a$) is a diagram demonstrating interference affecting the transmission between two nodes in a particular slot;

FIG. 3($b$) is a diagram demonstrating a means for bypassing the interfering transmission demonstrated in FIG. 3($a$);

DETAILED DESCRIPTION

The present invention is useful for providing a method and an apparatus for multicasting real-time traffic in wireless ad-hoc networks that facilitates real-time variable-bit-rate (VBR) data transmission among a plurality of nodes in a wireless ad-hoc network. It builds a multicast structure, and also includes a real-time multicast scheduler, which schedules packet transmissions to avoid collisions due to simultaneous transmissions. The following description is presented to enable one of ordinary skill in the art to make and use the invention, which may be incorporated in the context of a variety of applications. Various modifications to the preferred embodiment, as well as a variety of uses in different applications will be readily apparent to those skilled in the art. Notably, the general principles defined herein may be applied to other embodiments. Thus, the present invention is not intended to be limited to the embodiments shown, but is to be accorded the widest scope consistent with the principles and novel features disclosed herein.

In order to assist in the explanation of the present invention, several definitions are necessary. "Color" is used as a generic term for the specific bandwidth resource used by each node to receive and transmit packets. For example, in a FDMA system colors denote the frequency bands used by nodes for reception and transmission, in a TDMA system colors denote time slots, and in a CDMA system colors denote different codes. In embodiments using hybrid systems (e.g. FDMA/TDMA), colors denote the different combinations of bandwidth resource (e.g. frequencies/time slots) that could be used by each node. The "periodicity" p of transmissions is defined as the number of frames between successive transmissions of a node. It is important to note that the minimum periodicity is two because it is assumed that a node cannot transmit while receiving. In fact, a periodicity of p=2 is considered optimal for the present invention. Note that it is possible for a node to transmit and receive at the same time in different colors. However, it is desirable to re-use colors as much as possible (to maximize the set of usable colors) so that other colors may be used for other multicast sessions or applications. "Frame position" (fp) is defined as the first frame number (the source is considered, for convenience herein, to always transmit in frame number 0) in which the node can transmit a packet. It refers to the relative transmission time of a node in terms of frames with respect to the source node's transmissions. Note that the frame duration depends upon the frequency with which a VBR source transmits data and the end-to-end delay requirements. Thus, frame position is a system parameter that may be set as necessary for a particular implementation. Signaling is performed through a separate reliable signaling channel, for example in a round-robin fashion. The method of the present invention is receiver-oriented, and the nodes can reserve multiple colors per frame. Nodes attempt to have a desired number of colors reserved in a frame, based on the current source rate $RC_{des}$, but can also become part of the multicast mesh if they have some minimum bandwidth of $RC_{min} < RC_{des}$ colors reserved. However if the number of colors a node is able to reserve is less than $RC_{min}$, then the node is considered disconnected, and will attempt anew to affiliate with the multicast mesh. That is, $RC_{min}$ is the minimum bandwidth that a node must have reserved.

Figure 1:
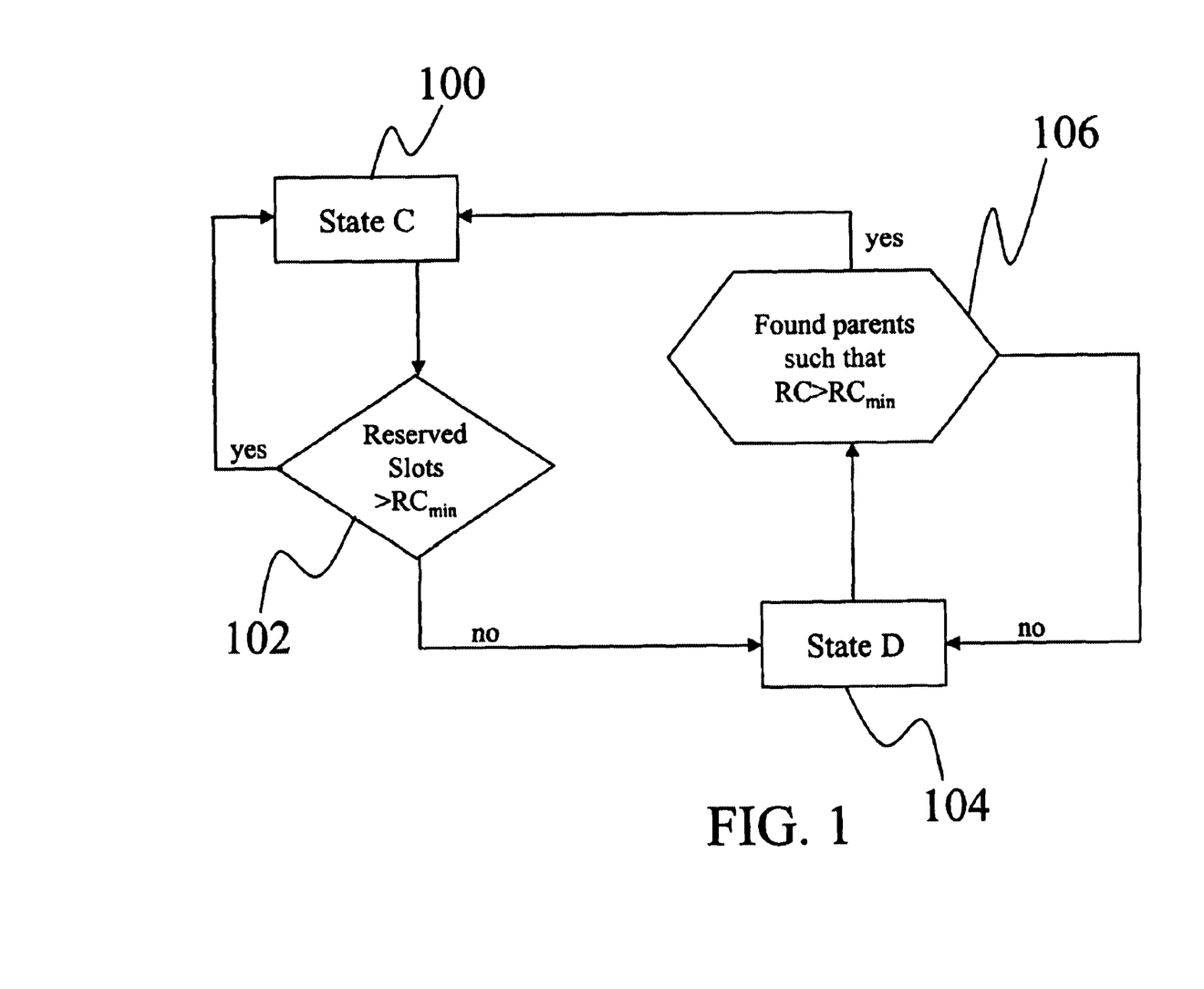
FIG. 1 is an example of a multicast mesh which comprises a plurality of nodes, and for which the method of the present invention provides real-time variable bit-rate multicasting.

A flow chart, depicting the nodal state transitions is depicted in FIG. 1, where State C 100 represents the node in a Connected State C. As long as the node has reserved colors greater than the threshold $RC_{min}$ 102, the node remains in the Connected State C. If the number of reserved colors drops below the threshold $RC_{min}$, the node goes into a Disconnected State D 104. A node in the Disconnected State D will seek to find parent nodes such that upon connection, the number of reserved colors is greater than the threshold $RC_{min}$ 106. Once suitable parent nodes are found, the node will rejoin the mesh in the Connected State C.

A VBR source generates dynamically varying traffic and alternates between "active" and "inactive" periods. The resulting traffic can be modeled as consisting of a slowly varying, low frequency, component and a rapidly varying, high frequency, component. Typically, video traffic has such characteristics with the low frequency component having a period of at least one second, i.e. the mean bandwidth required by a particular session varies slowly with time. Practical methods that provide bandwidth allocation such that the allocation is in accordance with the mean bandwidth of the source can therefore be implemented. Such adaptive bandwidth allocation schemes have the obvious advantage that long-term over-reservation of bandwidth is eliminated, and therefore more than one source can potentially be multiplexed to use the same bandwidth.

In the context of wireless multicasting of VBR traffic in a wireless ad-hoc network, nodes can continuously estimate the current mean source rate and adapt the amount of reserved bandwidth accordingly. That is, if the estimated mean source rate increases, nodes will try to reserve more colors per frame, and if the mean source rate drops, nodes will release colors. Nodes will estimate the source rate using some known estimation technique, or the source will explicitly include information about the current rate in the packet header. Packets in excess of the reserved bandwidth that are to be relayed by a node will be transmitted in a random access fashion. Generally, it is assumed that the source burstiness is limited around the mean rate, for example via a token bucket at the source.

The environment in which the present invention is designed to operate preferably consists of a few nodes to a few hundreds of distributed wireless ad-hoc nodes. It is assumed that each node can communicate with a set of immediate neighbors, and that the network is strongly connected at all times. The present invention performs optimally when the nodes are slowly moving, i.e. at pedestrian speeds. It does function if the nodes are vehicular users, but the number of connection breaks increases with node speed, and may result in excessive connection breaks, resulting in the consumption of large amounts of overhead for connection re-establishment.

A focus of the present invention is the facilitation of multicast streaming of real-time VBR data in wireless ad-hoc networks. Presented herein is a means for the adaptive allocation of bandwidth via tracking the mean source rate. Nodes participating in the multicast session estimate continuously the average traffic rate and attempt to reserve more colors if the average traffic rate increases, or release excessive colors if the average rate decreases. Nodes can attempt to receive packets from different multicast parents, creating a multicast mesh structure, adding to the flexibility of the present invention. Routing packets through a mesh structure is robust because it can cope well with the harsh nature of the wireless environment. For example, if a node experiences poor quality reception from one parent (resulting in a high packet dropping rate), it can attempt to acquire the missing packets from another parent node, thus creating a kind of "soft handoff" situation. Also, any bandwidth required above what is reserved at any given time, typically due to the rate of the source temporarily exceeding the mean rate, can be acquired on a random-access basis.

The present invention may be used to multicast data from a single source in an ad-hoc network, and differs from existing methods in two important ways. First, not all nodes need to transmit; only a subset of the nodes relay packets to all other nodes. Second, neighboring nodes can simultaneously transmit packets if they do not jam the reception of any neighboring node, that is, nodes that transmit at the same time do not need to hear each other's transmissions because the transmissions are not intended for each other. These two differences can be exploited to provide a greater reduction in the bandwidth necessary for a multicast session than is possible with methods presently in the literature. Key to this reduction is that routing and resource allocation are done concurrently; that is, colors are allocated at the same time that the multicast mesh is created.

The VBR traffic class cannot tolerate delay jitter. However, it may tolerate a small amount of packet losses. In order to ensure the provisioning of the desired quality of service (QoS) by controlling delay jitter, bandwidth is reserved on the multicast structure. The present invention performs the dual tasks of building the structure, and also, en route, reserving bandwidth within the structure. It relies on a fixed bandwidth allocation for each multicast session, and the allocated bandwidth is re-used as the multicast structure is built. As the structure is built, the protocol attempts to optimally stream multicast data to all multicast group members and to avoid packet collisions. Furthermore, the protocol is distributed such that no centralized control is required to provide bandwidth reservations. However, it is worth noting that for a particular application, the present invention could be used with a centralized control mechanism, in which case, each node would have to approach the centralized control mechanism to request bandwidth, and the bandwidth would then be allocated by the control mechanism. However, higher latencies would result during the establishment of affiliations, and it would also be necessary to provide a mechanism to help release resources when nodes leave the mesh. For VBR calls, the required bandwidth is reserved in each portion of the multicast structure as the structure is being built. The assumed sessions are similar to Internet multicast sessions, wherein the source is multicasting a session and the onus is on the receivers to join the session. Since the method is receiver initiated, the amount of overhead incurred in terms of signaling packets is low because the multicast control messages do not have to include significant routing information. The amount of information that needs to be exchanged between nodes is independent of the number of nodes comprising the ad-hoc network. Because the present invention makes reservations in terms of codes, time-slots, or frequency channels (or a combination thereof), reservations are made and maintained at the medium access control layer, as opposed to the IP layer. Thus, the overhead incurred is much lower. Furthermore, the inherent broadcast nature of the wireless channel is exploited to implicitly maintain soft-state updates (periodic updates of affiliation information), as opposed to explicit updates required if RSVP is used. This low overhead is in contrast to the overhead incurred by traditional bandwidth reservation methods, which function at the networking (IP) layer such as RSVP. The low overhead is especially attractive in a wireless environment, wherein bandwidth is expensive and it is desirable to keep the overhead as low as possible. The method also has an inherent self-healing feature i.e., it recovers from link/node failures (due to mobility/jamming) in a fast and efficient manner.

It is to be noted that the mobility of the nodes and the harshness of the time-varying environment make it impossible to provide deterministic quality of service guarantees all of the time. The real-time multicast scheduler enables the provisioning of a coarse level of quality of service (QoS). The real-time multicast scheduler can reserve bandwidth in terms of time, frequency, and/or code, and is therefore flexible enough to be overlaid on top of any medium access protocol. The present invention may be applied to any future wireless ad-hoc network carrying real-time multicast traffic, and may also be applicable in sensor networks and autonomous robot/machine coordination systems.

Figure 2:
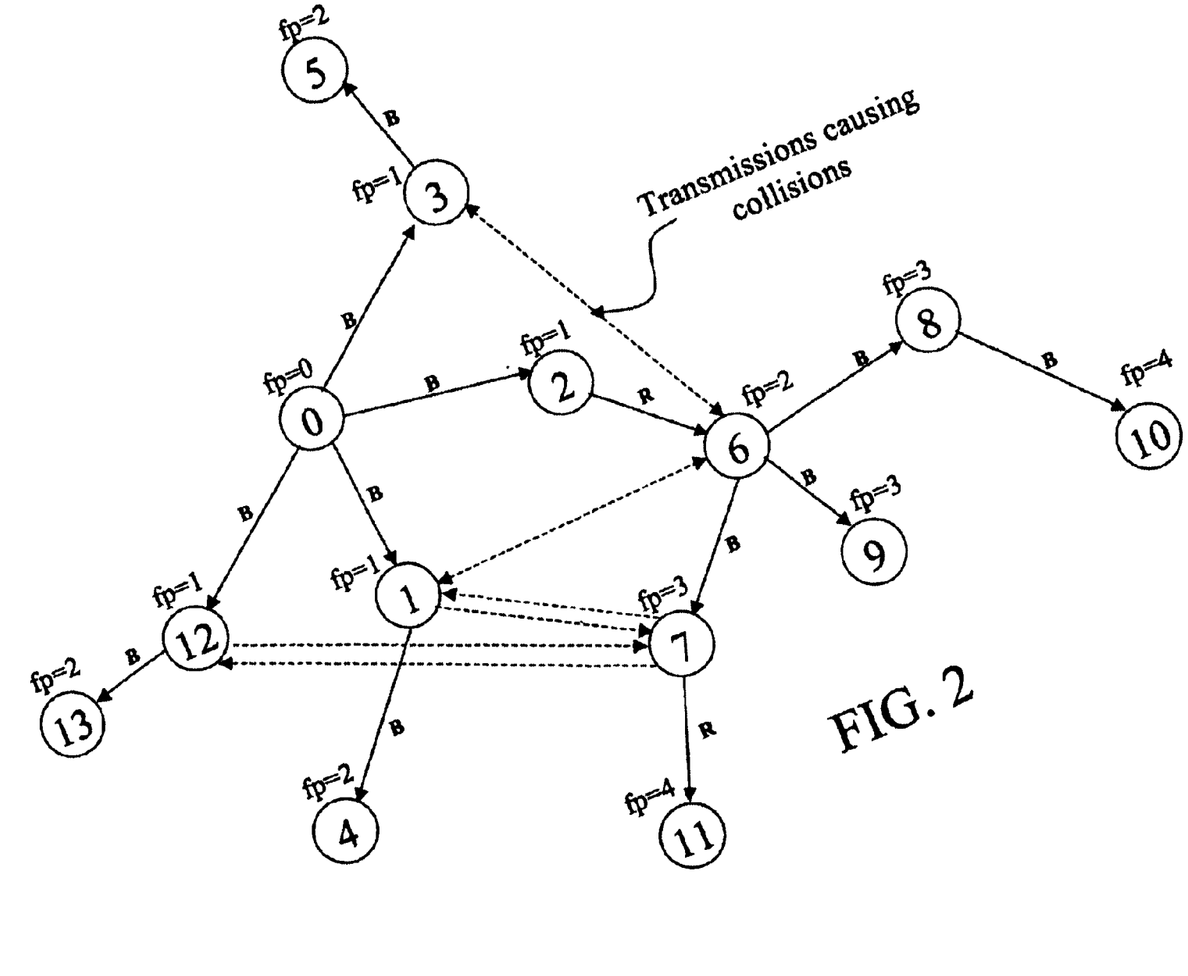
FIG. 2 is a state transition diagram representing the transitions between the different operating states of a node.

Multicasting real-time packets with real-time QoS guarantees is a complex problem. Due to simultaneous transmissions of nodes in a multicast mesh structure, some of the multicast group members might not receive any packets. To illustrate, an example of a multicast mesh is presented in FIG. 2, with the nodes represented by a plurality of circles, and their interconnections represented by lines with arrows. In the mesh structure shown, if multicast member nodes 1, 2, and 3 transmit simultaneously, where node 1 is transmitting to relay the multicast information to node 5, a collision occurs at node 6. Thus, node 6, and therefore the part of the mesh which relies on node 6 for receiving multicast data, fail to get any multicast packets. It is therefore necessary that a scheduling method be used in order to help avoid packet collisions. Thus, to provision QoS for real-time traffic, multicast routing and scheduling should be optimized jointly.

Figure 3A:
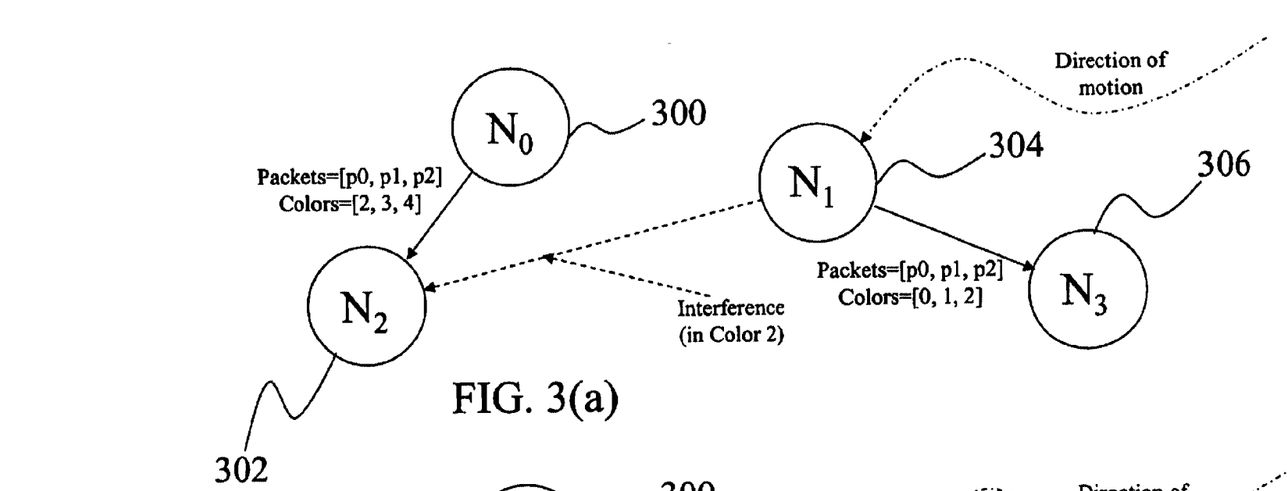
Figure 3B:
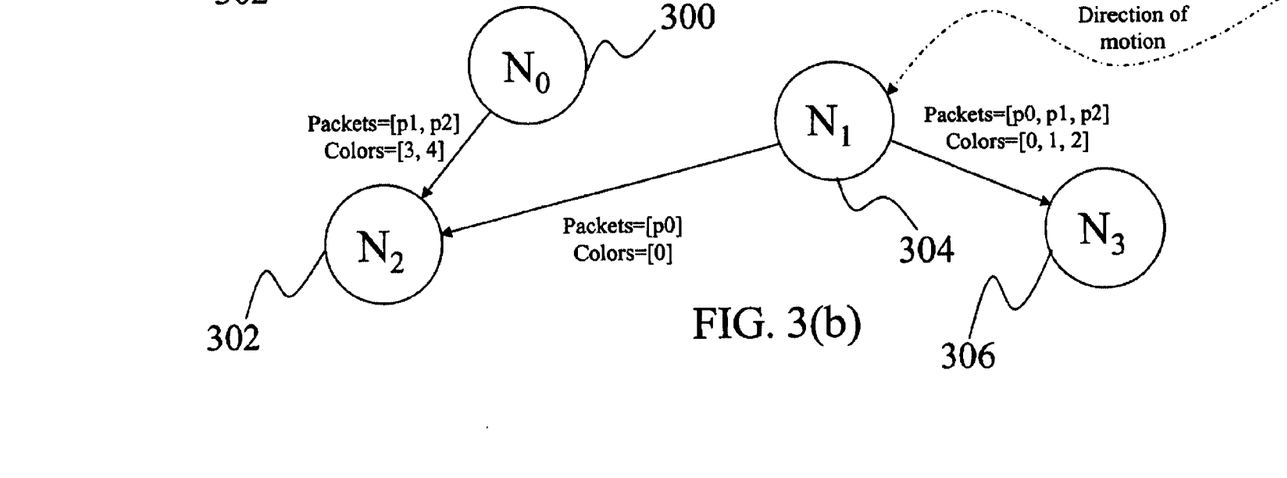

Since nodes might have more than one reserved color, they can rely on different parents, to receive packets in different colors. This adds a degree of flexibility to the reservation process, although it would be optimal if a node could receive all packets from a single parent. If this is not possible, then multiple parents may try to transmit packets in random-access slots. However, a parent node may not be able to relay certain packets in a frame either because it does not have them, because it does not have a sufficient number of slots to transmit all of the packets, or because some of its children may experience too high an interference in the slots in which the parent node can transmit. FIG. 3(a) provides a diagram demonstrating interference affecting the transmission between two nodes in a particular slot. All of the nodes shown have three slots reserved for receiving packets $p_0$, $p_1$, and $p_2$. Initially, node $N_0$ 300 relays these packets to node $N_2$ 302 in slots 2, 3, and 4. However, due to mobility, node $N_1$ 304, that is relaying the same packets to node $N_3$ 306 in slots 0, 1, and 2 appears in the neighborhood of node $N_2$ 302. As a result, node $N_2$ 302 can no longer receive packet $p_0$. If node $N_0$ 300 cannot relay packet $p_0$, to node $N_2$ 302 in some other slot for any of the reasons outlined above, node $N_2$ 302 can receive that packet $p_0$ from node $N_1$ 304, and therefore should now attempt to also become a child of node $N_1$ 304 for the purpose of receiving packet $p_0$. The resulting multicast mesh wherein node $N_2$ 302 receives packets from multiple parents is shown in FIG. 3(b).

Figure 4:
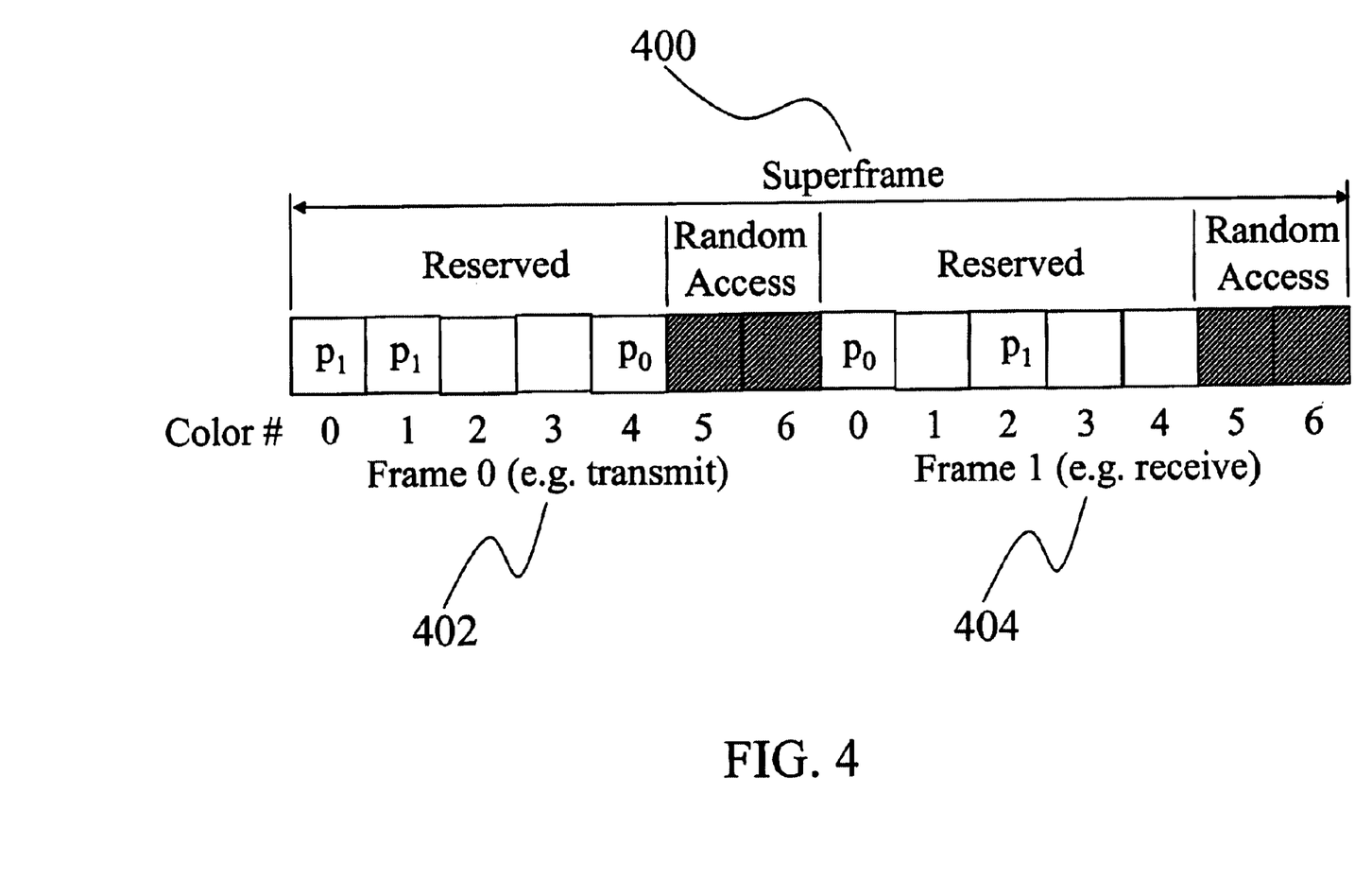
FIG. 4 is a diagrammatic representation of a frame structure used in the present invention, specifically for the case utilizing TDMA.

Nodes cannot transmit and receive simultaneously in the data channel. As an example of the frame structure used with the present invention, a TDMA frame structure is shown in FIG. 4. It is important to note that the frame structure, although shown, for simplicity of rendering, as a TDMA frame structure in FIG. 4, can consist of any scheme of colors, for example TDMA/CDMA/FDMA, in which the diagram of the frame structure would be extended into three dimensions. With respect to FIG. 4, the slotted time is grouped into a super-frame 400, consisting of a transmit frame F0 402 and a receive frame F1 404. The transmit frame F0 402 and receive frame F1 404 need not be in a particular order within the super-frame 400. What is important is that a particular node transmits and receives in different frames within the super-frame 400. In general, the transmit frame of a node $N_i$ is denoted by $F_i$, where $F_i$ takes on a value of 0 or 1 depending on whether node $N_i$ can transmit in frame 0 or in frame 1, respectively, where i is an index number for the node. Each frame $F_i$ within the super-frame 400 includes at least one reserved slot and at least one random-access slot. Two nodes transmit in the same frame if they have the same frame number F.

As previously mentioned, multiple colors are reserved for a session and used in each frame. Packets transmitted by the source in each frame are numbered sequentially for that frame at the medium-access control (MAC) layer, and each node marks its receive or transmit slots with the frame sequence number of the packet to be received or transmitted in the particular color. For example, FIG. 4 shows that a node receives packets $p_0$ and $p_1$ in TDMA slots 0 and 2, respectively, and transmits packet $p_0$ in TDMA slot 4 and packet $p_1$ in TDMA slots 0 and 1, where the multiple transmissions of packet $p_1$ are for the purpose of supporting different children.

Packets in a frame that are in excess of the reserved number of slots are transmitted/received in the random-access portion of the frame. Denoting RC as the number of reserved colors for a node, or slots in the TDMA case of FIG. 4, packets with frame-sequence numbers 0 to RC−1 will be received in the reserved slots, while any extra packets will be received in the random-access slots. The parent node notifies its children of the specific random-access slots they have to listen to by appending the relevant information to packets transmitted during the reserved portion of the bandwidth.

Channel and Connectivity Model

All nodes are assumed to transmit with a known power $P_T$. The power received by a node $N_0$ due to the transmission of a node $N_j$ is given by $P_{j0}=G_{j0}P_T$, where $G_{j0}$ denotes the power attenuation on the path between nodes $N_0$ and $N_j$. It is assumed that $G_{ij}$ follows a simple propagation decay law, i.e. $G_{ij}=d_{ij}^{-\eta}$, where $d_{ij}$ is the distance between nodes $N_i$ and $N_j$ and $\eta$ is the power loss exponent. The signal-to-interference ratio (SIR) at node $N_0$ when node $N_j$ transmits is given by:

$$SIR = \frac{G_{j0}}{\sum_{i \neq j} G_{i0}}, \quad (1)$$

where nodes $N_i$ have frame numbers $F_i=F_j$, and transmit in the receive color of node $N_0$, and where the interference may occur as a result of any undesirable signal, including narrowband and wideband. A packet is received correctly if its SIR is above a certain threshold $\gamma$. It is further assumed that, in absence of co-channel interference, a node can communicate with nodes up to a distance $d_{max}$, away. This distance typically depends on the transmit power $P_T$, the noise floor, and the sensitivity of the receivers. Note that the larger the transmit power $P_T$, the fewer the number of relays that will exist in the multicast mesh, and thus, the required bandwidth will be smaller. On the other hand, with smaller transmit powers, more nodes will need to relay packets, and bandwidth requirements will increase. It is assumed that nodes have knowledge of the path losses to all of their one-hop neighbors. The slow variations of the channel, due to path loss and shadow fading are easily tracked, in contrast to fast fading variations due to multipath, which are not easily estimated.

Scheduling Rules

The primary goal of the multicast scheduler is to create and maintain a multicast mesh such that: (1) each node successfully receives all desired packets transmitted in the reserved portion of the bandwidth; (2) the reserved bandwidth adaptively changes in order to accommodate the dynamics of the mean source rate, and satisfies the minimum required bandwidth for a specific source rate; and (3) the maximum distance, in terms of the number of hops to any node from the source, in the multicast mesh, is minimized.

A node $N_0$ that is a relay and has a transmit frame $F_0$ 402 in the super-frame 400 will cause co-channel interference to the reception of all nodes, except its children, that have a receive frame $F_0$ and receive in the transmit slots of $N_0$. Nodes with a receive frame $F_0$, whose SIR drops below the threshold $\gamma$ because of node $N_0$'s transmission, will not be able to receive correctly the packets destined for them in the interfered slots. Hence, node $N_0$ should not transmit in color c, if the SIR of any receiving neighbor in that slot drops below $\gamma$ as a result of the transmission. Moreover, note that two or more nodes, which are not necessarily neighbors, could at the same time, and independently, decide that color c can be used for transmissions if such transmissions do not bring the SIR of any simultaneously receiving neighboring node below $\gamma$. However, by transmitting simultaneously, and without knowing of each others transmission, they can eventually jam some receiving node. To minimize the possibility of such occurrences, the SIR threshold for rendering a slot unusable could be set higher than $\gamma$. Two scheduling rules have been developed to fulfill this purpose, and are as follows.

Rule 1: A node $N_0$, with transmit frame $F_0$ cannot transmit in color c if there is at least one node $N_j$ in its neighborhood, having receive frame $F_0$, such that the node $N_j$ is not a multicast child of node $N_0$, receives in color c, and $$SIR(N_j) = \frac{G_{ij}}{\sum_{k \neq i} G_{kj} + G_{0j}} < \gamma_1,$$

for some preset $\gamma_1$, such that $\gamma_1 > \gamma$, (2)

where node $N_i$ is a parent of node $N_j$, and nodes $N_k$ have transmit frames $F_k = F_0$ and transmit in color c.

Note that in order for node $N_0$ to decide whether it can use color c, it needs to know the resulting SIR of all of its neighbors that would be interfered with in color c. Furthermore, to estimate the resulting SIR, $N_0$ must have knowledge of the factors $G_{ij}$ and $\Sigma_{k \neq i} G_{kj}$ from equation (2) for all neighbors $N_j$. In the event that such information is deemed too expensive to be relayed, Rule 1 can simply become Rule 1(a) as follows.

Rule 1(a): No SIR information is necessary. A node $N_0$ with transmit frame $F_0$ cannot transmit in color c if there is at least one node $N_j$ in its neighborhood with receive frame $F_0$, such that $N_j$ is not a multicast child of node $N_0$ and receives in color c.

Rule 1(a) is more restrictive than Rule 1, and will lead to somewhat higher bandwidth requirements. Furthermore, since nodes maintain information only about one-hop neighbors, a node $N_0$ conforming with Rule 1 can still jam another node that is more than one-hop away and receives in the same frame and slot as those in which node $N_0$ transmits. Without information from nodes more than one hop away, such a possibility cannot be excluded, but if the transmit power levels are small, such effects are negligible.

A node $N_0$ wishing to reserve a color c for receiving from a potential parent node $N_j$ can do so if the parent node $N_j$ is able to transmit in color c and if the SIR of node $N_0$ in color c is above a certain threshold, which will be taken to be higher than the threshold necessary for correct reception of a packet. Therefore, a second scheduling rule may be stated as follows.

Rule 2: A node No can reserve color c for receiving from a neighboring node $N_j$ if (1) node $N_0$ has receive frame $F_j$; (2) node $N_j$ can transmit in color c, as determined from Rule 1; and (3) the SIR of node $N_0$ satisfies the equation, $$SIR(N_0) = \frac{G_{j0}}{\sum_{k \neq j} G_{k0}} < \gamma_2,$$

for some preset $\gamma_2$, such that $\gamma_2 > \gamma$,
where nodes Nk have transmit frame $F_k = F_j$ and transmit in color c.

It is noteworthy that here, node $N_0$ can easily estimate the SIR in color c by knowing the path loss $G_{j0}$ to its potential parent node and the interference in color c. Both the path loss and the interference can easily be estimated.

Signalling Information Exchanged Between Nodes

Each node is represented in the system by a nodal set Q for a particular multicast session, defined as follows:

Q={ID, HC, F, RC, $RC_{des}$, $RC_{min}$, PID, Rx, RxSeq, SIR, $G_p$, Tx, TxSeq, UC}, where ID represents the node's unique ID;

HC represents the node's hop-count, i.e. the number of hops made by a signal en-route from the source to a node;

F represents a bit which indicates the transmit frame of the super-frame;

RC represents the number of receive colors currently reserved by the node;

$RC_{des}$ represents the desired number of receive colors, as estimated by the node based on the current traffic load;

$RC_{min}$ represents the minimum acceptable number of reserved slots, which depends on the acceptable packet dropping rate; $RC_{des}$ and the number of random-access slots determine the packet-dropping rate at the node;

PID represents a vector indicating the parents of a node, PID[i], where i=0, 1, 2, . . . , RC−1, where all parents must have the same hop count, and where some or all of the elements of PID[i] may be identical, i.e. the same parent transmits multiple packets to its child;

Rx is a vector with the receive colors of the node, Rx[i], i=0, 1, 2, . . . , RC−1;

$G_p$ represents a vector containing the SIR of the node in its receive slots Rx, SIR[i], i=0, 1, 2, . . . , RC−1;

Tx represents a vector with the transmit slots of the node, Tx[i], i=0, 1, 2, . . . , $N_{TX}$−1;

TxSeq is a vector representing the sequence in which packets are transmitted in the transmit colors, TxSeq[i], i=0, 1, 2, . . . , $N_{Tx}$−1, that is, the node transmits a packet with frame sequence number TxSeq[i] in slot Tx[i];

UC is a vector which lists the slot numbers of slots unusable by the node, UC[i], i=0, 1, 2, . . . , $N_{UC}$−1.

Nodes in the Connected State C exchange maintenance packets mp having the following fields:

mp.ID, the node's unique identification;

mp.PID, the set of the node's parents' IDs as well as potential parent's IDs;

mp.HC, the node's hop-count from the multicast source;

mp.F, the node's transmit frame in the super-frame;

mp.RS, the number of colors currently reserved by the node;

mp.Rx, the node's current set of receive slots, as well as additional slots which the node anticipates using for reception;

mp.Rx.Seq, the sequence in which the node receives packets in the corresponding receive colors;

mp.Tx, the node's set of transmit colors;

mp.TxSeq, the sequence in which the node transmits packets in a frame;

mp.UC, the set of slots which cannot be used by the node for transmission;

mp.SIR, the set of SIRs the node experiences in its receive colors; and mp.Gp, the set of path losses between the node and its parents.

The fields mp.SIR and mp.Gp are needed only if the usable colors are determined based on Rule 1. If the set of unusable colors UC is determined based on the alternative, and stricter, Rule 1(a) without SIR information, then these fields may be omitted. It is noteworthy that mp contains a portion of the nodal set Q, which characterizes each node.

Maintenance packets mp serve the primary purpose of updating the databases of neighboring nodes with the latest status information of a connected node. The maintenance packets mp can be used by nodes in the Connected State C that do not have the desired bandwidth, i.e. for which $RC<RC_{des}$, in order to attempt to reserve more slots in the frame. This may happen, for example, either because the node is being interfered with in some of the already reserved slots or because the data rate, and therefore $RC_{des}$, have increased. To that effect, the node may include in its mp.PID the IDs of potential parents that could provide the extra packets it needs to satisfy its quality of service (QoS) criterion. In such a case, the node will include in the mp.Rx and the mp.RxSeq fields, the extra receive slots and the sequence of packets it needs to receive, respectively.

Therefore, the cardinality of the vectors mp.PID, mp.Rx, and mp.RxSeq may be larger than that of RC.

Nodes in the Disconnected State D, i.e. nodes for which $RC<RC_{min}$, use connect messages, conn, to attempt to re-connect to the multicast mesh. conn messages have the following fields:

conn.ID, the node's ID;

conn.PID, the IDs of potential parents for the node;

conn.Rx, the receive colors the node is attempting to use, i.e. the node would like to receive in color conn.Rx[i] from its parent node with ID conn.PID[i];

conn.RxSeq, the sequence in which the requesting node attempts to receive packets;

conn.F, the node's transmit frame;

conn.SIR, the SIR in each of the receive slots conn.Rx; and conn.Gp, the path loss to each parent of the requesting node.

If Rule 1(a) is followed, rather than Rule 1, no SIR information is relayed between nodes, and the last two fields are not necessary.

Information Maintained by a Node

All nodes have knowledge of immediate neighbors that participate in the multicast session, i.e. are in state C, and they maintain a data structure for each such neighbor which contains relevant information such as the transmit color set, the unusable color set, etc. of the neighbor. Additionally, colors that are relays in the multicast mesh maintain a data structure which contains information about their children and other pertinent information. Specifically, each node maintains the following data structures:

(a) Neighborhood of the Node; an entry NB of This Structure has the Following Elements:

NB.ID, the ID of the neighbor;

NB.HC, the hop-count of the neighbor from the multi-casting source node;

NB.F, the transmit frame of the neighbor;

NB.G, the path loss to the neighbor;

NB.t, the last time the neighbor sent an update message;

NB.Rx, a vector containing the positions of the colors in which the neighbors receive;

NB.RxSeq, a vector indicating the sequence in which packets are received from the neighbor;

NB.PID, a vector containing the IDs of the parents of the neighbor;

NB.Tx, a vector containing the transmit colors of the neighbor, if any;

NB.TxSeq, a vector of the sequence in which packets are transmitted in the transmit colors of the neighbor; and NB.UC, a vector of unusable colors of the neighbor.

(b) Nodes That are Relays in the Multicast Mesh; Therefore in the Connected State C, and Comprising a Children Data-structure, the Entries CH of Which Have the Following Elements:

CH.ID, the child's ID;

CH.Rx, a vector of receive colors of the child, i.e. colors in which the child receives from the specific node; and CH.t, a vector including components CH.t[i], which denote the last time at which the corresponding receive slot, CH.Rx[i], was used to transmit to the child.

(c) Nodes in the Connected State C; an Unusable Color Data Structure, Including Entries UC With the Following Elements:

UC.c, the unusable color; and

UC.t, the last time the color was added to the unusable set.

This last structure is required only for the time-related information it provides. Having this information, the node can render a slot usable again if the slot is not refreshed as being used in in the UC.c element before a timeout period.

Signaling in the Connected State C

As long as the reserved bandwidth of a node satisfies its minimum QoS criterion $RC_{min}$, it remains in the Connected State C. The node receives packets from its parents either in the reserved colors or in the random-access colors. The node estimates continually the mean data rate and updates its $RC_{des}$ and $RC_{min}$ accordingly.

For its signaling color, the node first determines whether it satisfies the desired QoS criterion, i.e. whether $RC=RC_{des}$. If not, but instead $RC<RC_{des}$, the node will try to reserve further colors. To do so, it first finds the frame-sequence numbers of the packets it is missing. Next, using the information in its neighbors data-structure NB, it searches for neighbors that already transmit the required packets. If the SIRs in the corresponding colors are above $\gamma_2$, according to equation (3), it adds the neighbors' IDs to mp.PID as extra parents. If through the above procedure, the node has not met its QoS criterion yet, it will attempt to find neighbors that can add new transmit colors in their Tx set in order to relay the missing packets. If, on the other hand, $RC>RC_{des}$, the node has over-reserved bandwidth and therefore will release the extra colors so that it has $RC_{des}$ colors reserved.

During signaling in colors different from its own, the node will receive maintenance packets from neighboring nodes that are in the Connected State C. Using these maintenance packets, the node will update its neighbors, children, and unusable colors databases. The signaling algorithm is described in the following pseudo-code.

Signaling Pseudo-Code
(a) Pseudo-Code for Signaling in the Connected State C

```
if(RoundRobinSignalingColor == MySignalingColor)
    if(RC < RC_des)
        GetMissingSequence(RxSeq, MSeq);
        TryExistingTransmissions(NB, HC - 1, MSeq, NewParents, NewColors,
            NewSeq);
        if(Mseq NOT empty)
            TryAdding Transmissions(NB, HC - 1, MSeq, NewParents,
                NewColor, NewSeq);
        endif
    else if(RC>RC_des)
        ReleaseColors(RC, RC_des, RxSeq, Rx);
    endif
    mp=ControlMessage(ID, PID, HC, F, RC, Rx, RxSeq, Tx, TxSeq, UC, SIR, Gp);
    Broadcast(mp)
else
    Receive(MaintenancePacket mp){
        UpdateNeighborDataBase(NB, mp, t_now);
        UpdateUnusableSlotsDataBase(UC, conn);
    }
endif
ReleaseColors(RC, RC_des, RxSeq, Rx);
    for(i=RC_des; i < RC; i++){
        /* say i == RxSeq[j]*/
        remove RxSeq[j] from RxSeq;
        remove Rx[j] from Rx
    }
GetMissingSequence(RxSeq, Mseq):
    for(i=0; i < RC_des; i++){
        if(i NOT in RxSeq)
            Mseq ← i;
        endif
    }
UpdateChildrenDataBase(CH, pckt, t_now):
/* pckt can be either packet mp or conn */
    for(i such that pckt.PID[i] == id){
        if(pckt.Rx[i] NOT in Tx AND NOT in UC)
            AddTxColor(pckt.Rx[i], pckt.Seq[i], t_now);
            AddChild(CH, pckt.id, pckt.Rx[i], t_now);
        else if(pckt.Rx[i] in Tx) /* say, pckt.Rx[i] == TX[j] */
            if(pckt.Seq[i] == TxSeq[j])
                AddChild(CH, pckt.id, pckt.Rx[i], t_now);
            endif
        endif
    }
UpdateUnsuableColorsDataBase(UC, pckt):
/* No SIR information relayed */
/* pckt can be either packet mp or conn */
    for(i such that pckt.PID[i] ≠ id){
        if(pckt.F == F+1 (mod 2) AND pckt.Rx[i] NOT in Tx)
            AddUnusableColor(UC, pckt.Rx [i], t_now);
        endif
    }
UpdateUnusableColorsDataBase(UC, pckt):
/* SIR information relayed */
/* pckt can be either packet mp or conn */
    for(i such that pckt.PID[i] ≠ id){
        if(pckt.F == F + 1 (mod 2) AND pckt.Rx[i] NOT in Tx)
            EstimatedSIR = pckt.Gp[i]/(pckt.SIR[i]/pckt.Gp[i] + G_{id pckt.id});
            if(EstimatedSIR < γ_1)
                AddUnusableColor(UC, pckt.Rx[i], t_now);
            endif
        endif
    }
TryExistingTransmissions(NB, HC, Mseq, NewParents, NewSlots, NewSeq):
    for(all NB such that NB.HC == HC){
        for(all colors c){
            ok=c in NB.Tx AND c NOT in (Rx OR NewColors);
            if(ok) /* say c == NB.Tx[i] */
                /* I(c) is the interference measured in color c */
                if(NB.TxSeq[i] in MSeq AND NB.G/I(c) > γ_2)
                    NewColors ← c;
                    NewParents ← NB.id;
                    NewSeq ← NB.TxSeq[i];
                    Remove NB.TxSeq[i] from Mseq;
                    if(MSeq empty) return; endif
```

```
            endif
        endif
    }
}
TryNewColors(NB, HC, Mseq, NewParents, NewColors, NewSeq):
    for(all NB such that NB.HC == HC){
        for(all colors c){
            if(there is i such that MSeq[i] in NB.RxSeq)
                ok=c NOT in (NB.Tx OR NB.UC OR Rx OR NewColors);
                if(ok)
                    /* I(c) is the interference measured in color c */
                    i(NB.G/I(s) > γ₂)
                        NewColors ← c;
                        NewParents ← NB.id;
                        NewSeq ← NB.TxSeq[i];
                        Remove NB.TxSeq[i] from Mseq;
                        if(MSeq empty) return; endif
                    endif
                endif
            endif
        }
    }
```

(b) Pseudo-Code for Signaling in the Disconnected State D

If the reserved bandwidth of a node, in terms of the number of reserved colors, drops below the $RC_{min}$, the node will consider itself disconnected from the multicast mesh. It will erase its children and unusable colors database, and it will stop transmitting packets if it was a relay. During the next signaling period, and in its own signaling color, it will attempt to find neighboring nodes that are connected to the mesh and that can relay at least the $RC_{min}$ packets to it, but preferably $RC_{des}$ packets. Within signaling colors other than its own, it will collect maintenance packets mp, updating its neighbors database, and it will ignore connect packets conn. The pseudo-code for signaling of nodes in the Disconnected State D is given below. Note that it uses the same subroutines as were defined for the nodes in the Connected State C.

```
if(RoundRobinSignalingcolor == MySignalingColor)
    HC = GetMinHopCount(NB);
loop: for(i=0; i < RC_des; i++)
    MSeq[i] = i;
    TryExistingTransmissions(NB, HC, MSeq, PID, Rx, RxSeq);
    if(MSeq NOT empty)
        TryAdingTransmissions(NB, HC, MSeq, PID, Rx, RxSeq);
    endif
    if(sizeof(RxSeq) > RC_min)
        conn = ConnectMessage(ID, PID, F, Rx, RxSeq, SIR, Gp);
        Broadcast(conn);
    else
        HC = HC + 1;
        goto loop;
    endif
else
    Receive(MaintenancePacket mp){
        UpdateNeighborhoodDataBase(NB, mp, t_now);
    }
    or Receive(ConnectPacket conn){
        DoNothing( );
    }
endif
```

System Performance

Figure 5:
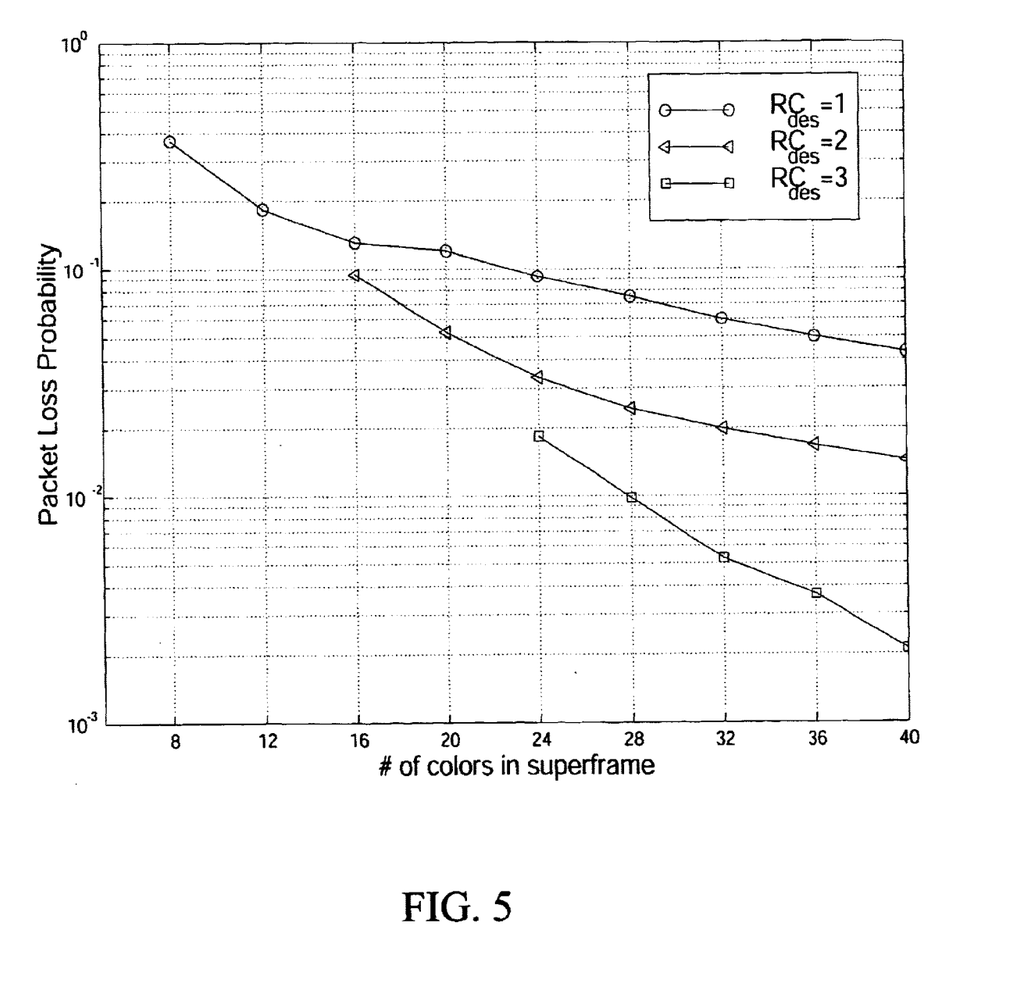
FIG. 5 is a graph showing the packet loss probability versus total available colors in a super-frame for different $RC_{des}$ values in a simulated embodiment of the present invention.

An embodiment of the present invention was simulated as a network model. Fifty nodes were considered, and were dispersed in an area of one square kilometer. In all cases, the SIR required for successful receipt of a packet was set at γ=10 dB, with the exponent η of the path loss set equal to four, and a super-frame of 10 ms was assumed. It was also assumed that the nodes can accurately estimate the mean traffic rate. By assigning a number of reserved slots corresponding to the peak source rate, the packet loss rate is zero (in a static network), but bandwidth utilization is very poor. It was assumed that the number of packets arriving at the source in every super-frame follows a Poisson distribution with a mean of one. Packets in excess of the reserved bandwidth were transmitted in the random-access portion of the transmit frame of each relay. Queuing was considered non-existent, and therefore, delay jitter was bounded by the duration of one super-frame. $RC_{min}$ was set equal to $RC_{des}$, and the total number of colors allocated for reservation was obtained by multiplying $RC_{des}$ by 8, which is the number required for $RC_{des}=1$. For a static network of fifty nodes with $d_{max}=250$ meters, FIG. 5 is a graph that shows packet loss probability versus the total number of available colors in a super-frame for different values of $RC_{des}$. Statistics were gathered from simulated nodes with the maximum hop-count, which were expected to have the largest packet loss rate. From FIG. 5, note that the abscissa of the leftmost point of each curve corresponds to the total number of reserved slots, and the respective packet loss rate is the fraction of packets in a frame that are in excess of $RC_{des}$, since there are no random-access slots in this case. From FIG. 5, it is obvious that assigning only one reserved slot, i.e. $RC_{des}=1$, for each node, and receiving all packets in excess of the first in the random-access portion, results in a severe packet loss rate. However, for $RC_{des}=2$, using 24 random-access slots, for a total of 40 slots in the super-frame, the packet loss rate is slightly above 1%. As the number of reserved colors $RC_{des}$ and the number of colors in the superframe increase, the packet loss decreases. Therefore, whenever feasible, it is desirable to maximize these quantities in order to minimize packet loss. The optimization of a particular system may vary from application to application, and is considered within the ability of one skilled in the art.

What is claimed is:

1. A method for bandwidth reservation for real-time traffic in a wireless ad-hoc network including a plurality of nodes transmitting and receiving data via a plurality of colors, with the transmitting and receiving of the data being performed periodically with a data period 2, wherein each one of the plurality of nodes has a connection state selected from the group consisting of connected and disconnected, wherein the plurality of nodes includes a communication origin node from which a data transmission occurs, and wherein each node has a super-frame including a transmitting frame for transmitting packets and a receiving frame for receiving packets, with the transmitting packets having a transmit sequence within the transmitting frame and the receiving packets having a receiving sequence within the receiving frame, with a frame position F defining the position of transmitting frame in the super-frame, a set of transmit colors in which the node is currently transmitting, a set of colors in which the node is currently receiving, a set of usable colors, and a set of unusable colors, wherein the nodes which a particular node receives from are identified as the parents of the particular node, with the particular node identified as the child of the parent nodes, and wherein a transmitting frame of a parent node is the receiving frame of its child node, and wherein the method comprising the steps of:

a. periodically transmitting a disconnected maintenance packet from each disconnected node, with each disconnected maintenance packet including the disconnected maintenance packet transmitting node ID, the node IDs of the parent nodes from which disconnected node seeks to receive, the frame position F of the disconnected maintenance packet transmitting node, the colors in which the disconnected maintenance packet transmitting disconnected node seeks to receive, and the receiving sequence for the disconnected maintenance packet transmitting node;

b. periodically transmitting a connected maintenance packet from each connected node, with each connected maintenance packet including the node ID of the connected maintenance packet transmitting node, the node IDs of the parent nodes from which connected node is currently receiving, the frame position of the node transmitting the connected maintenance packet, the colors in which the connected maintenance packet transmitting node receives, the receiving sequence for the maintenance packet transmitting node, a set of the usable colors in which the connected node may transmit, and a set of unusable colors in which the connected node is prohibited from transmitting;

c. receiving, at each particular node of the plurality of nodes, the maintenance packets from all nodes within a transmission range of the particular node;

d. using the maintenance packets received at each particular node to update the set of usable colors and the set of unusable colors for the particular node, where the set of usable colors for the particular node is defined as the complement of the set of unusable colors, and where the set of unusable colors of a first node N0 having transmit frame position F0 includes color c0 if there is at least one node Nj within transmit range of node N0, having a receive frame position of F0, such that node Nj is not a child of node N0, where node Nj receives in color c0 from a parent node Ni, and where $$SIR(N_j) = \frac{G_{ij}}{\sum\limits_{k \neq i} G_{kj} + G_{0j}} < \gamma_1,$$

for a preset $\gamma_1$, such that $\gamma_1 > \gamma$, where:
k represents an index over all of the nodes having transmit frame positions of F0 and transmit color C0;
$G_{ij}$ represents the transmission power loss between the parent node Ni and node Nj;

$G_{kj}$ represents the transmission power loss between a given node having an index k and transmit frame position F0, and node Nj;
$G_{0j}$ represents the transmission power loss between node N0 and node Nj;
$\gamma$ represents the threshold SIR for a transmission, below which a transmission cannot take place; and
$\gamma_1$ represents a preset SIR level greater than $\gamma$ and chosen to decrease the probability of SIR(Nj)<$\gamma$; and e. reserving colors c0 and establishing data connections for connected and disconnected nodes Na, where a node Na can reserve color ca for receiving from a neighboring node Nc if node Na has receive frame Fc, and if node Nc can transmit in color ca as determined in step d, and if the SIR of node Na satisfies the equation:

$$SIR(N_a) = \frac{G_{ca}}{\sum\limits_{k \neq c} G_{ka}} > \gamma_2,$$

for some preset $\gamma_2$, such that $\gamma_2 > \gamma$, where:
k represents an index over all of the nodes having transmit frame positions of Fc and transmit color ca;
$G_{ca}$ represents the transmission power loss between node Nc and node Na;
$G_{ka}$ represents the transmission power loss between a given node having an index k and a frame position Fc, and node Na;
$\gamma$ represents the threshold SIR for a transmission, below which a transmission cannot take place; and
$\gamma_2$ represents a preset SIR level greater than $\gamma$ and chosen to decrease the probability of SIR(Na)<$\gamma$; and f. periodically repeating steps a through e to update the ad-hoc network.

2. A method for bandwidth reservation for real-time traffic in a wireless ad-hoc network as set forth in claim 1, wherein the colors are channels developed from combinations selected from the group consisting of TDMA, CDMA, and FDMA schemes.

3. A wireless ad-hoc network developed and maintained by the method of claim 2.

4. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 2.

5. A wireless ad-hoc network developed and maintained by the method of claim 1.

6. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 1.

7. A method for bandwidth reservation for real-time traffic in a wireless ad-hoc network including the steps of:

a. providing a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node;

b. periodically transmitting a disconnected maintenance packet from each disconnected node, with each disconnected maintenance packet including the disconnected maintenance packet transmitting node ID, the node ID of a parent node from which the disconnected node seeks to receive, the frame position fp of the disconnected maintenance transmitting node, and the color in which the disconnected maintenance packet transmitting disconnected node seeks to receive;

c. periodically transmitting a connected maintenance packet from each connected node, with each connected maintenance packet including the node ID of the connected maintenance packet transmitting node, the node ID of the parent node from which connected node is currently receiving, the frame position fp of the node transmitting the connected maintenance packet, the color in which the connected maintenance packet transmitting node receives, a set of the usable colors in which the connected node may transmit, and a set of unusable colors in which the connected node is prohibited from transmitting;

d. receiving, at each particular node of the plurality of nodes, the maintenance packets from all nodes within a transmission range of the particular node;

e. using the maintenance packets received at each particular node to update the set of usable colors and the set of unusable colors for the particular node, where the set of usable colors for the particular node is defined as the complement of the set of unusable colors, and where the set of unusable colors of a first node N0 having transmit frame position F0 includes color c0 if there is at least one node Nj within transmit range of node N0, having a receive frame position of F0, such that node Nj is not a child of node N0, where node Nj receives in color c0 from a parent node Ni, and where $$SIR(N_j) = \frac{G_{ij}}{\sum_{k \neq i} G_{kj} + G_{0j}} < \gamma_1,$$

for a preset $\gamma_1$, such that $\gamma_1 > \gamma$, where:

k represents an index over all of the nodes having transmit frame positions of F0 and transmit color C0;

$G_{ij}$ represents the transmission power loss between the parent node Ni and node Nj;

$G_{kj}$ represents the transmission power loss between a given node having an index k and transmit frame position F0, and node Nj;

$G_{0j}$ represents the transmission power loss between node N0 and node Nj;

$\gamma$ represents the threshold SIR for a transmission, below which a transmission cannot take place; and $\gamma_1$ represents a preset SIR level greater than $\gamma$ and chosen to decrease the probability of $SIR(N_j) < \gamma$; and f. reserving colors c0 and establishing data connections for connected and disconnected nodes Na, where a node Na can reserve color ca for receiving from a neighboring node Nc if node Na has receive frame Fc, and if node Nc can transmit in color ca as determined in step d, and if the SIR of node Na satisfies the equation:

$$SIR(N_a) = \frac{G_{ca}}{\sum_{k \neq c} G_{ka}} > \gamma_2,$$

for some preset $\gamma_2$, such that $\gamma_2 > \gamma$, where:

k represents an index over all of the nodes having transmit frame positions of Fc and transmit color Ca;

$G_{ca}$ represents the transmission power loss between node Nc and node Na;

$G_{ka}$ represents the transmission power loss between a given node having an index k and a frame position Fc, and node Na;

$\gamma$ represents the threshold SIR for a transmission, below which a transmission cannot take place; and $\gamma_2$ represents a preset SIR level greater than $\gamma$ and chosen to decrease the probability of $SIR(Na) < \gamma$; and g. periodically repeating steps a through f to update the ad-hoc network.

8. A method for bandwidth reservation for real-time traffic in a wireless ad-hoc network as set forth in claim 7, wherein the colors are channels developed from combinations selected from the group consisting of TDMA, CDMA, and FDMA schemes.

9. A wireless ad-hoc network developed and maintained by the method of claim 8.

10. A wireless ad-hoc network developed and maintained by the method of claim 7.

11. A method for bandwidth reservation for real-time traffic in a wireless ad-hoc network including a plurality of nodes transmitting and receiving data via a plurality of colors, with the transmitting and receiving of the data being performed periodically with a data period 2, wherein each one of the plurality of nodes has a connection state selected from the group consisting of connected and disconnected, wherein the plurality of nodes includes a communication origin node from which a data transmission occurs, and wherein each node has a super-frame including a transmitting frame for transmitting packets and a receiving frame for receiving packets, with the transmitting packets having a transmit sequence within the transmitting frame and the receiving packets having a receiving sequence within the receiving frame, with a frame position F defining the position of transmitting frame in the super-frame, a set of transmit colors in which the node is currently transmitting, a set of colors in which the node is currently receiving, a set of usable colors, and a set of unusable colors, wherein the nodes which a particular node receives from are identified as the parents of the particular node, with the particular node identified as the child of the parent nodes, and wherein a transmitting frame of a parent node is the receiving frame of its child node, and wherein the method comprising the steps of:

a. periodically transmitting a disconnected maintenance packet from each disconnected node, with each disconnected maintenance packet including the disconnected maintenance packet transmitting node ID, the node IDs of the parent nodes from which disconnected node seeks to receive, the frame position F of the disconnected maintenance packet transmitting node, the colors in which the disconnected maintenance packet transmitting disconnected node seeks to receive, and the receiving sequence for the disconnected maintenance packet transmitting node;

b. periodically transmitting a connected maintenance packet from each connected node, with each connected maintenance packet including the node ID of the connected maintenance packet transmitting node, the node IDs of the parent nodes from which connected node is currently receiving, the frame position of the node transmitting the connected maintenance packet, the colors in which the connected maintenance packet transmitting node receives, the receiving sequence for the maintenance packet transmitting node, a set of the usable colors in which the connected node may transmit, and a set of unusable colors in which the connected node is prohibited from transmitting;

c. receiving, at each particular node of the plurality of nodes, the maintenance packets from all nodes within a transmission range of the particular node;

d. using the maintenance packets received at each particular node to update the set of usable colors and the set of unusable colors for the particular node, where the set of usable colors for the particular node is defined as the complement of the set of unusable colors, and where the set of unusable colors of a first node N0 having transmit frame position F0 includes color c0 if there is at least one node Nj within transmit range of node N0, having a receive frame position of F0, such that node Nj is not a child of node N0, where node $N_0$ receives in color c0; and e. reserving colors c0 and establishing data connections for connected and disconnected nodes Na, where a node Na can reserve color ca for receiving from a neighboring node Nc if node Na has receive frame Fc, and if node Nc can transmit in color c0 as determined in step d, and if the SIR of node Na satisfies the equation:

$$SIR(N_a) = \frac{G_{ca}}{\sum_{k \neq c} G_{ka}} < \gamma_2,$$

for some preset $\gamma_2$, such that $\gamma_2 > \gamma$, where:
k represents an index over all of the nodes having transmit frame positions of Fa and transmit color C0;

$G_{ja}$ represents the transmission power loss between node Nc and node Na;

$G_{ka}$ represents the transmission power loss between a given node having an index k and a frame position Fc, and node Na;

$\gamma$ represents the threshold SIR for a transmission, below which a transmission cannot take place; and $\gamma_2$ represents a preset SIR level greater than $\gamma$ and chosen to decrease the probability of $SIR(Nc) < \gamma$; and f. periodically repeating steps a through e to update the ad-hoc network.

12. A method for bandwidth reservation for real-time traffic in a wireless ad-hoc network as set forth in claim 11, wherein the colors are channels developed from combinations selected from the group consisting of TDMA, CDMA, and FDMA schemes.

13. A wireless ad-hoc network developed and maintained by the method of claim 12.

14. A wireless ad-hoc network developed and maintained by the method of claim 11.

15. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 12.

16. A wireless ad-hoc network including a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node, said wireless ad-hoc network developed and maintained by the method of claim 11.

17. A method for bandwidth reservation for real-time traffic in a wireless ad-hoc network including the steps of:

a. providing a plurality of nodes transmitting and receiving data via a plurality of colors, with the transmitting and receiving of the data being performed periodically with a data period p, wherein each one of the plurality of nodes has a connection state selected from the group consisting of connected, disconnected, and temporarily disconnected, wherein the plurality of nodes includes a communication origin node from which a data transmission occurs, and wherein each node has a frame position fp with respect to the origin node, a set of transmit colors in which the node is currently transmitting, a color in which the node is currently receiving, a set of usable colors, and a set of unusable colors, wherein the node which a particular node receives from is identified as the parent of the particular node, with the particular node identified as the child of the parent node;

b. periodically transmitting a disconnected maintenance packet from each disconnected node, with each disconnected maintenance packet including the disconnected maintenance packet transmitting node ID, the node ID of a parent node from which the disconnected node seeks to receive, the frame position fp of the disconnected maintenance transmitting node, and the color in which the disconnected maintenance packet transmitting disconnected node seeks to receive;

c. periodically transmitting a connected maintenance packet from each connected node, with each connected maintenance packet including the node ID of the connected maintenance packet transmitting node, the node ID of the parent node from which connected node is currently receiving, the frame position fp of the node transmitting the connected maintenance packet, the color in which the connected maintenance packet transmitting node receives, a set of the usable colors in which the connected node may transmit, and a set of unusable colors in which the connected node is prohibited from transmitting;

d. receiving, at each particular node of the plurality of nodes, the maintenance packets from all nodes within a transmission range of the particular node;

e. using the maintenance packets received at each particular node to update the set of usable colors and the set of unusable colors for the particular node, where the set of usable colors for the particular node is defined as the complement of the set of unusable colors, and where the set of unusable colors of a first node N0 having transmit frame position F0 includes color c0 if there is at least one node Nj within transmit range of node N0, having a receive frame position of F0, such that node Nj is not a child of node N0, where node N0 receives in color c0;

f. reserving colors c0 and establishing data connections for connected and disconnected nodes Na, where a node Na can reserve color ca for receiving from a neighboring node Nc if node Na has receive frame Fc, and if node Nc can transmit in color c0 as determined in step d, and if the SIR of node Na satisfies the equation:

$$SIR(N_a) = \frac{G_{ca}}{\sum_{k \neq c} G_{ka}} > \gamma_2,$$

for some preset $\gamma_2$, such that $\gamma_2 > \gamma$, where:

k represents an index over all of the nodes having transmit frame positions of Fa and transmit color C0;

$G_{ja}$ represents the transmission power loss between node Nc and node Na;

$G_{ka}$ represents the transmission power loss between a given node having an index k and a frame position Fc, and node Na;

$\gamma$ represents the threshold SIR for a transmission, below which a transmission cannot take place; and $\gamma_2$ represents a preset SIR level greater than $\gamma$ and chosen to decrease the probability of SIR(Nc)<$\gamma$; and g. periodically repeating steps a through f to update the ad-hoc network.

18. A method for bandwidth reservation for real-time traffic in a wireless ad-hoc network as set forth in claim 17, wherein the colors are channels developed from combinations selected from the group consisting of TDMA, CDMA, and FDMA schemes.

19. A wireless ad-hoc network developed and maintained by the method of claim 18.

20. A wireless ad-hoc network developed and maintained by the method of claim 17.

* * * * *